Figure 52:
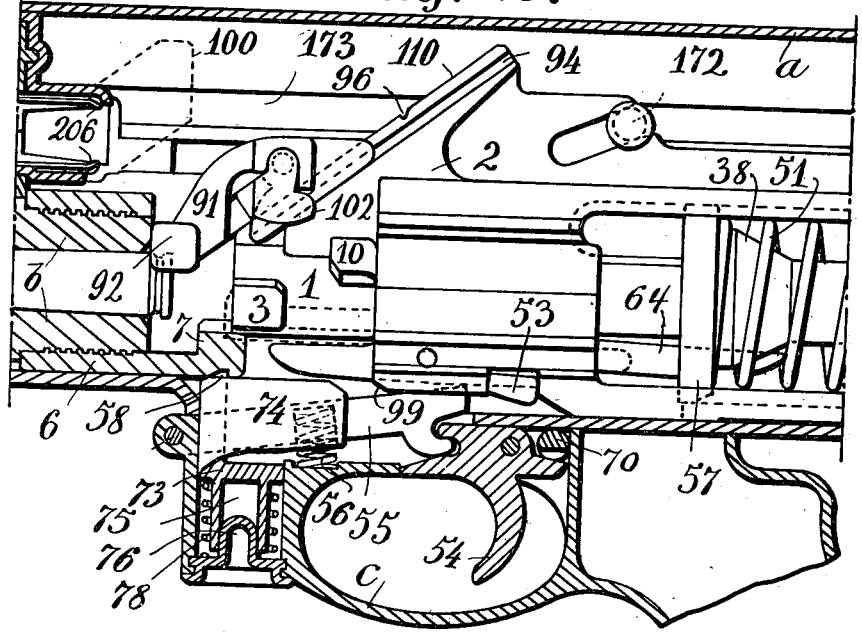

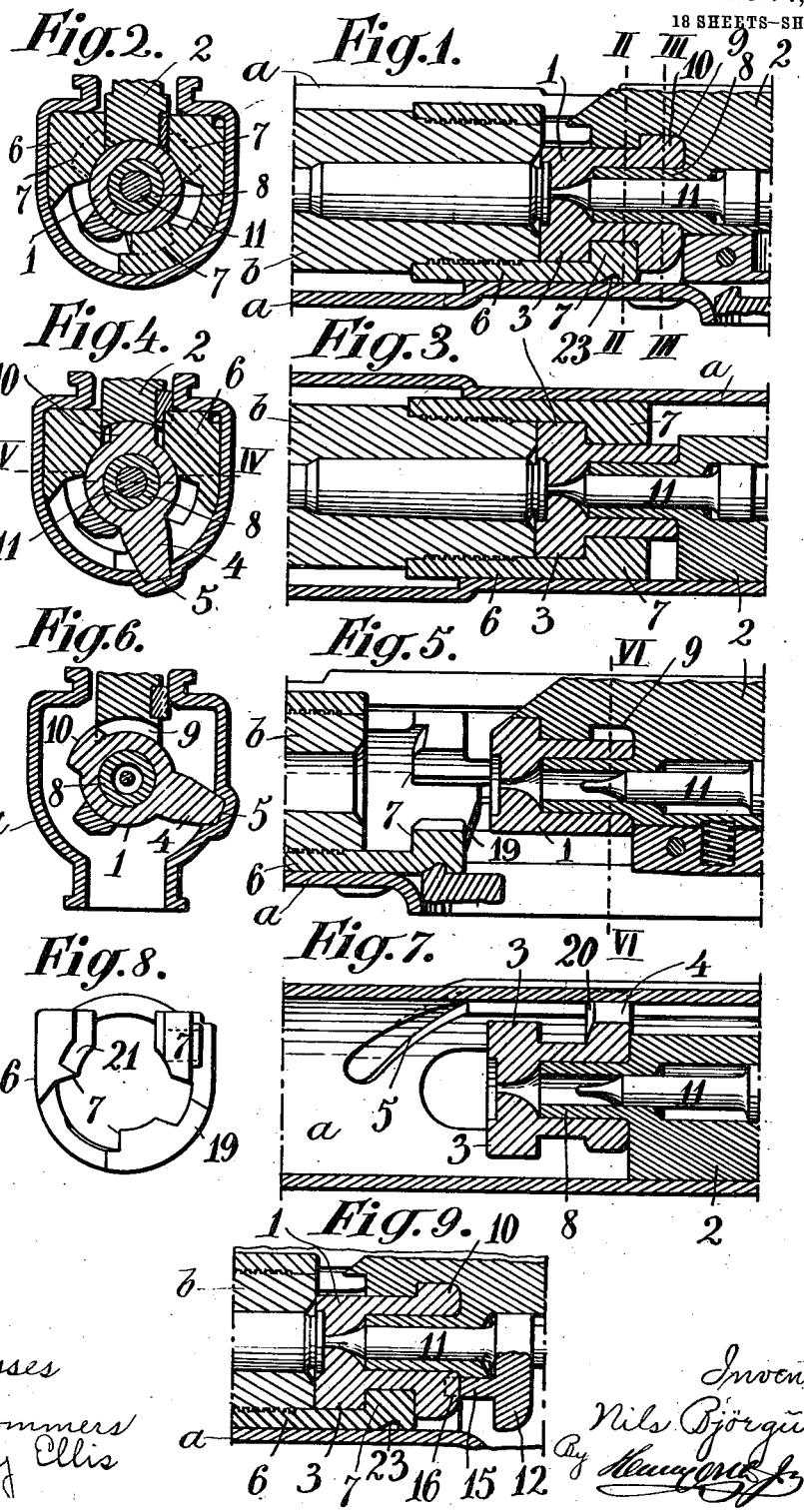

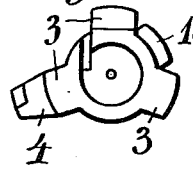
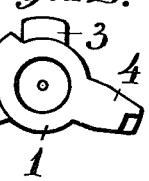
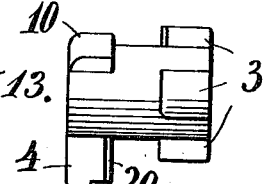
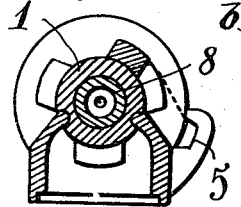
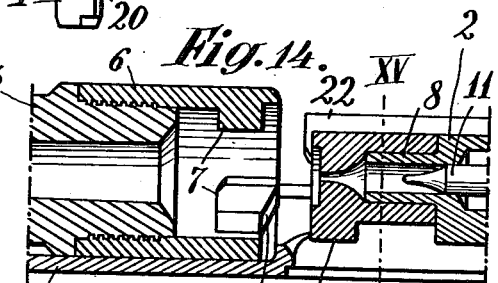
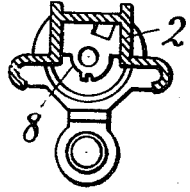
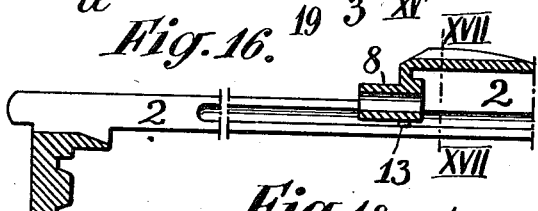
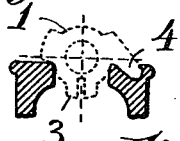
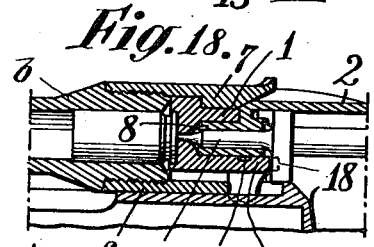
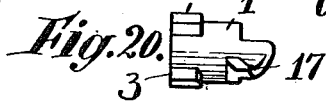
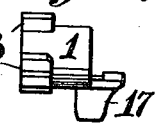

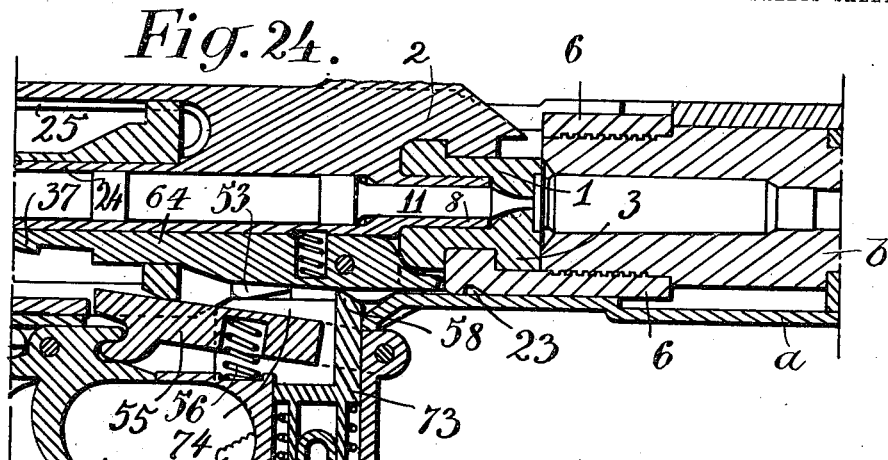
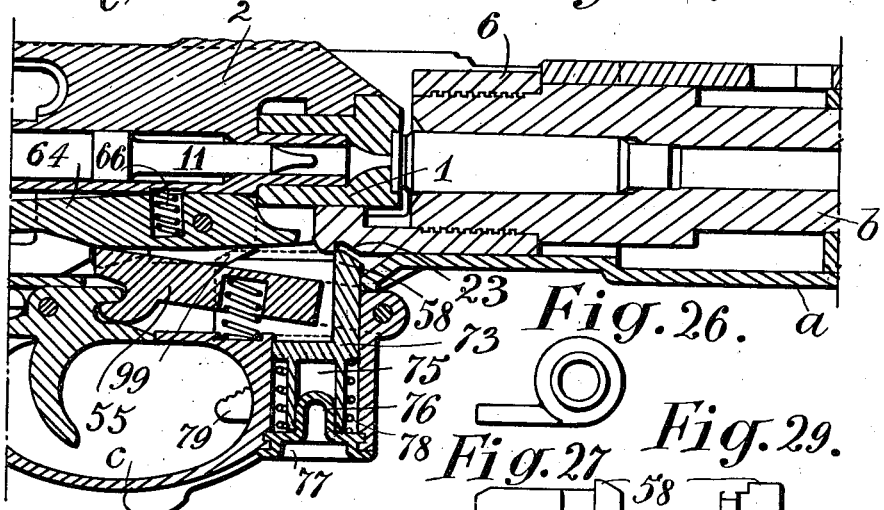
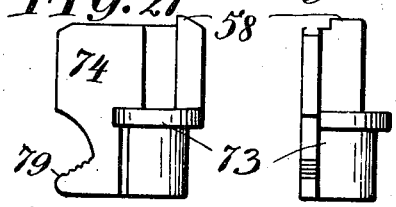

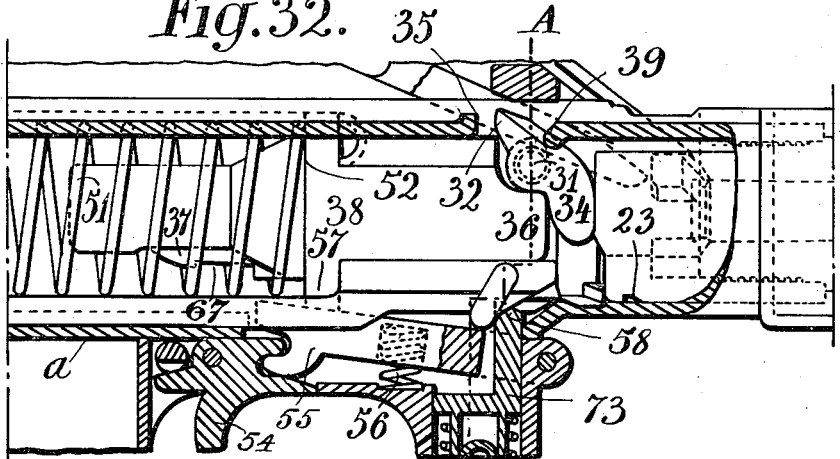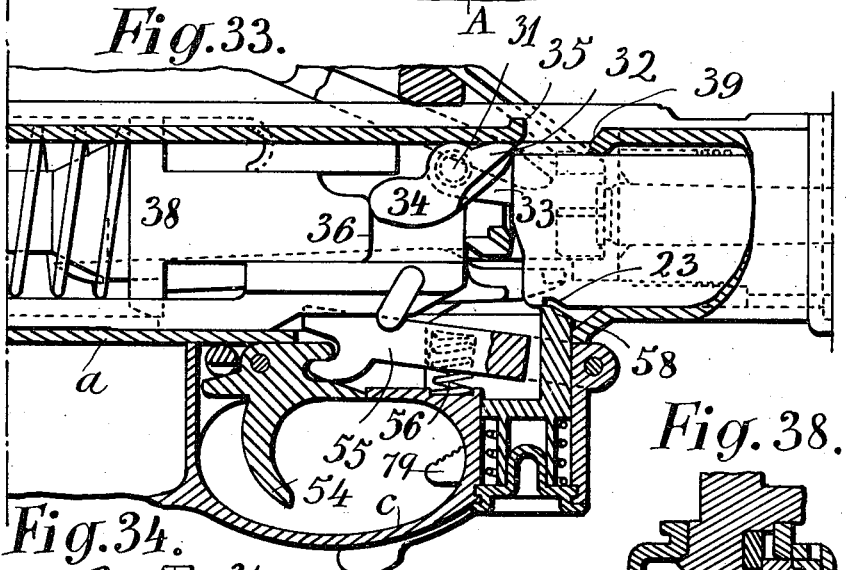

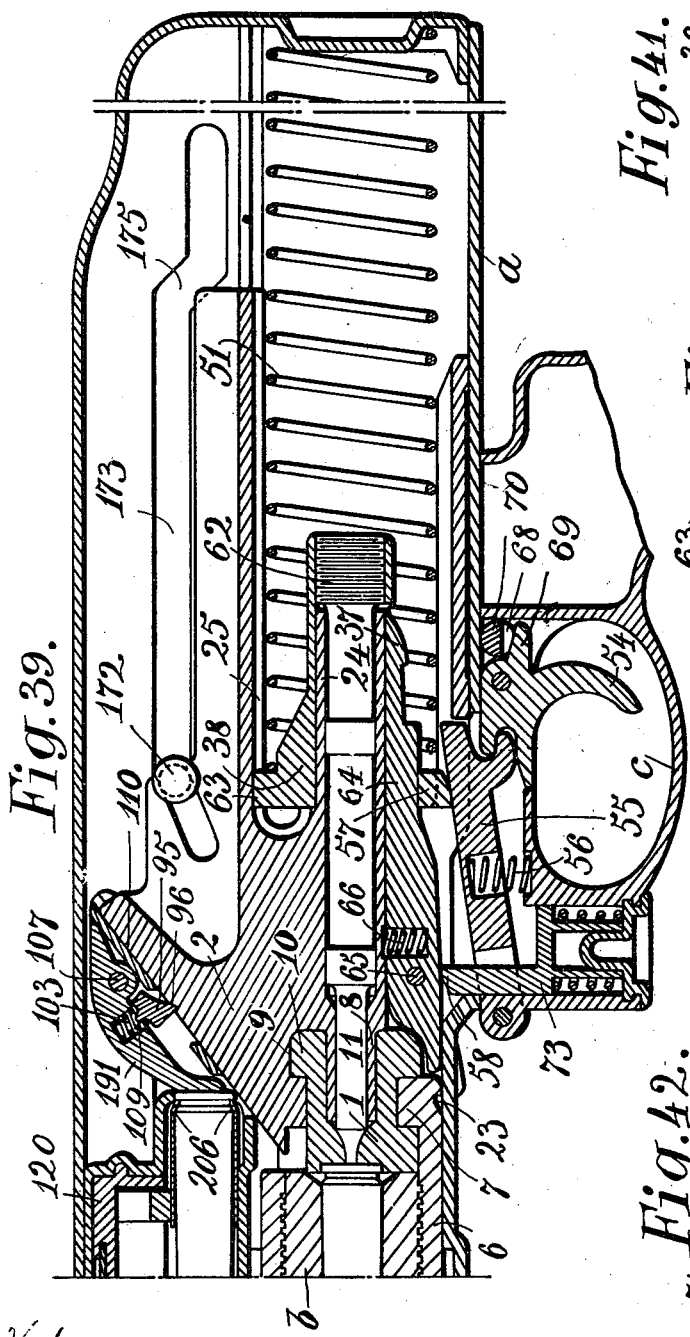
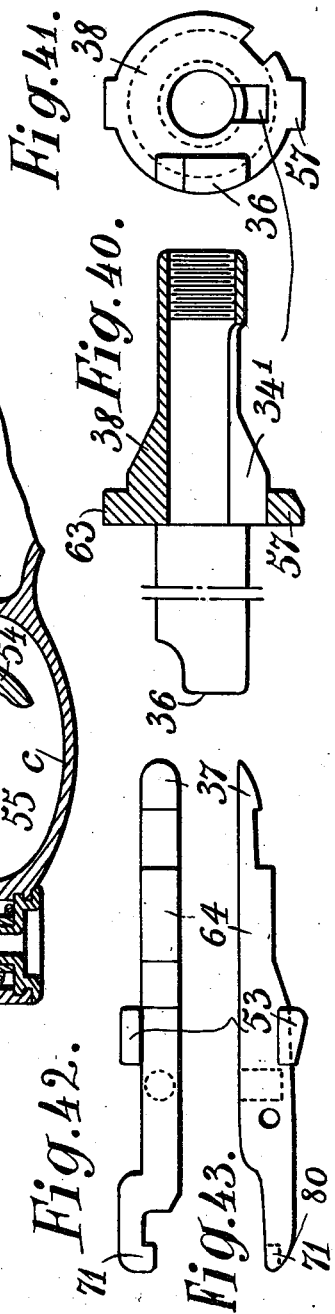

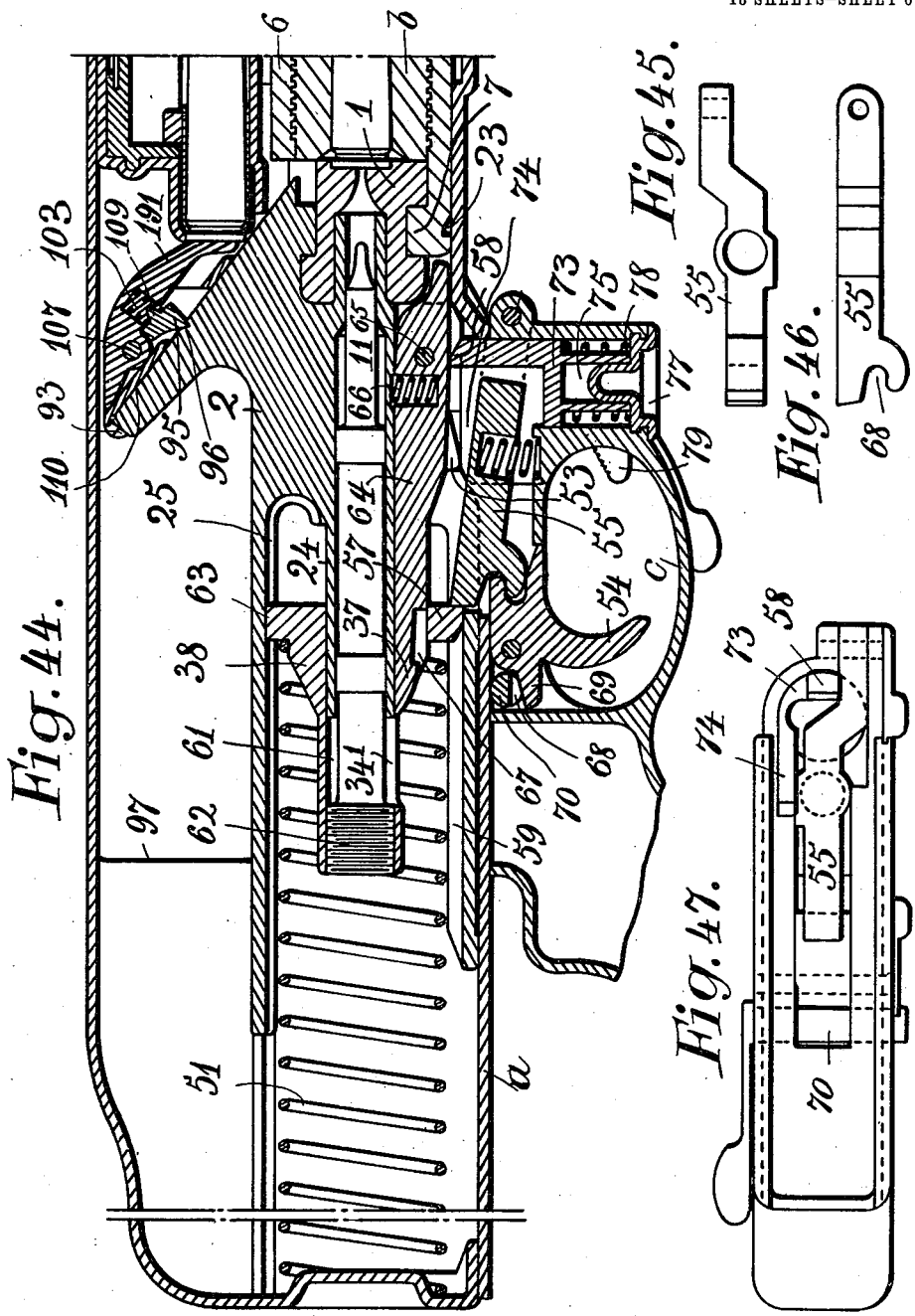

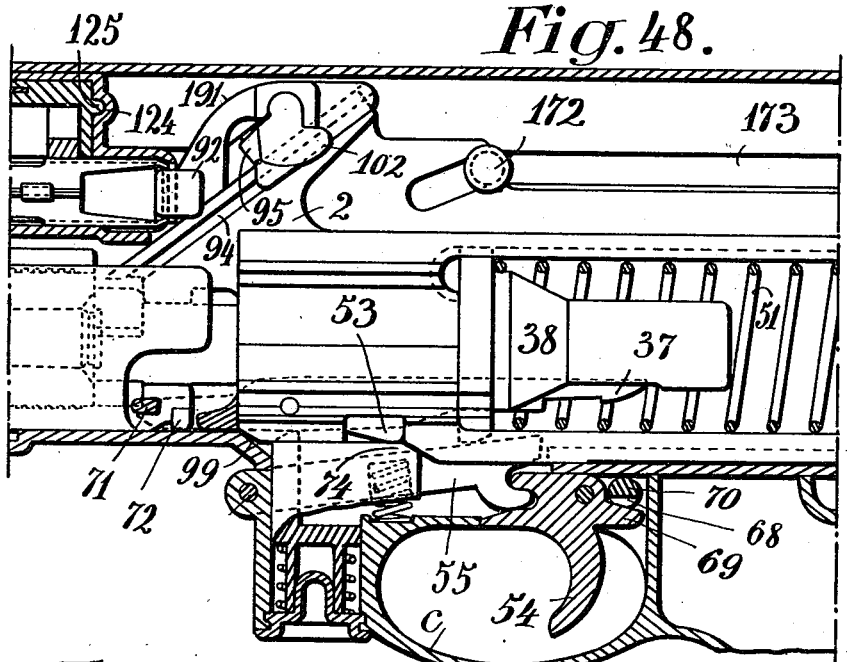
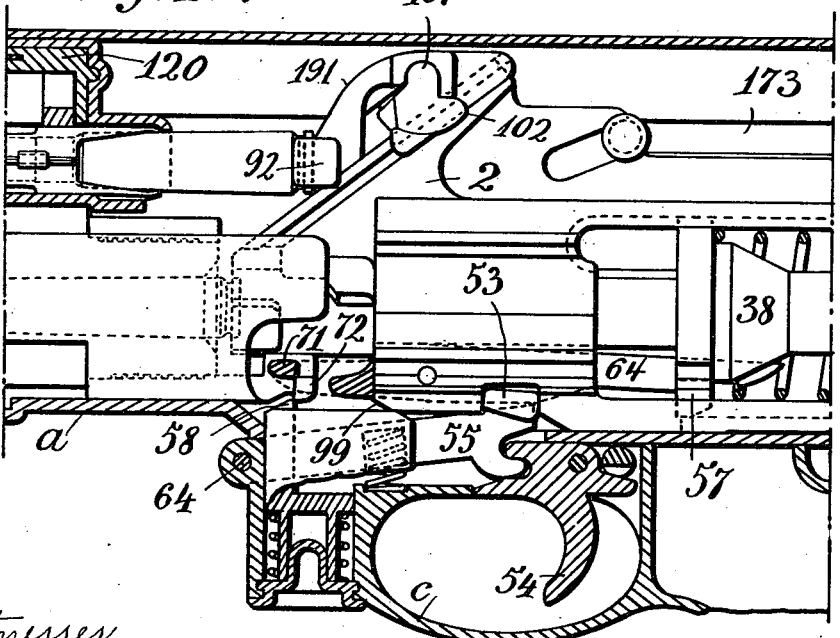

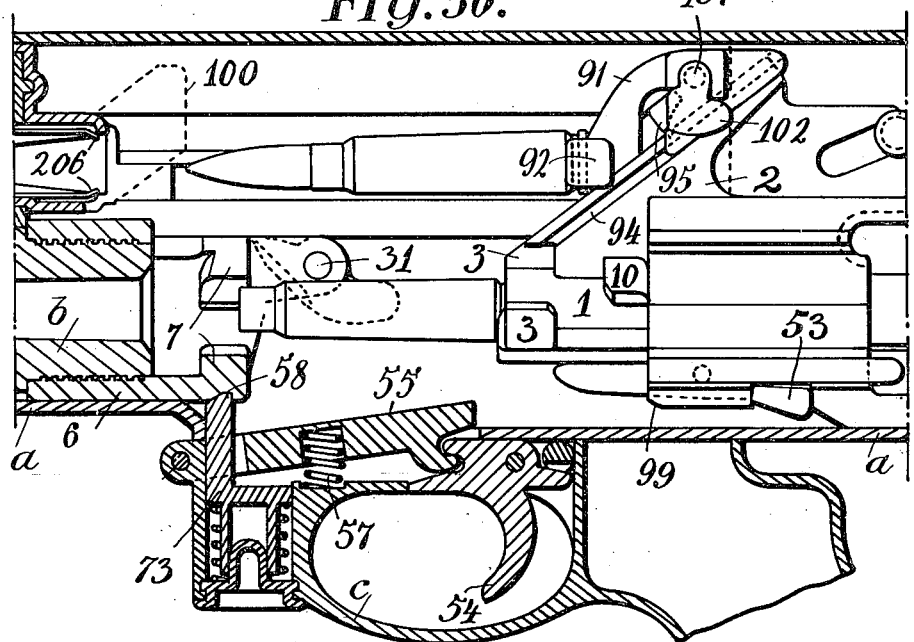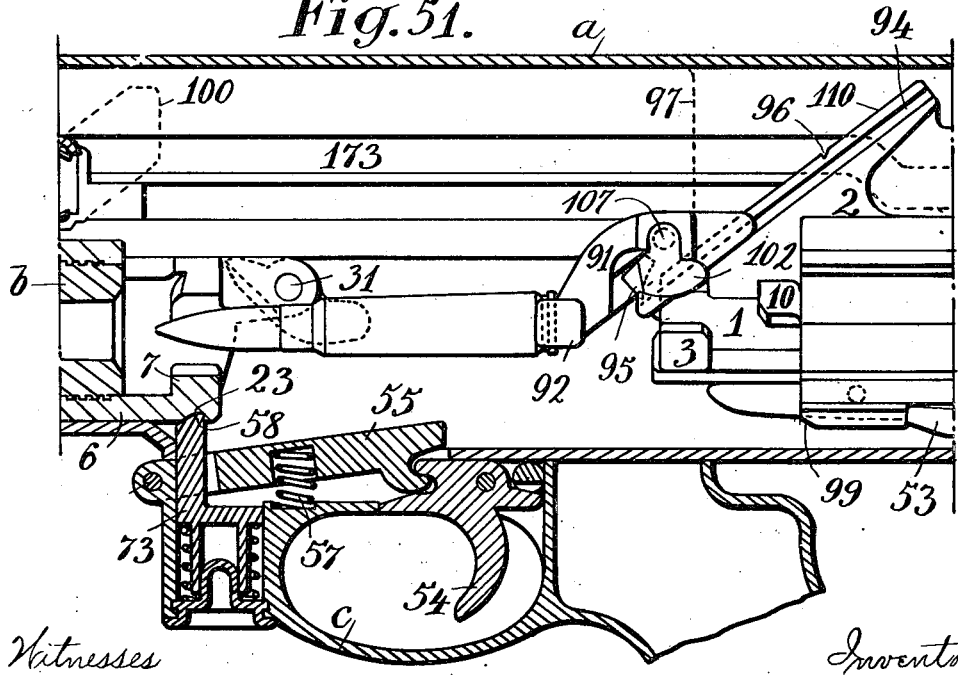

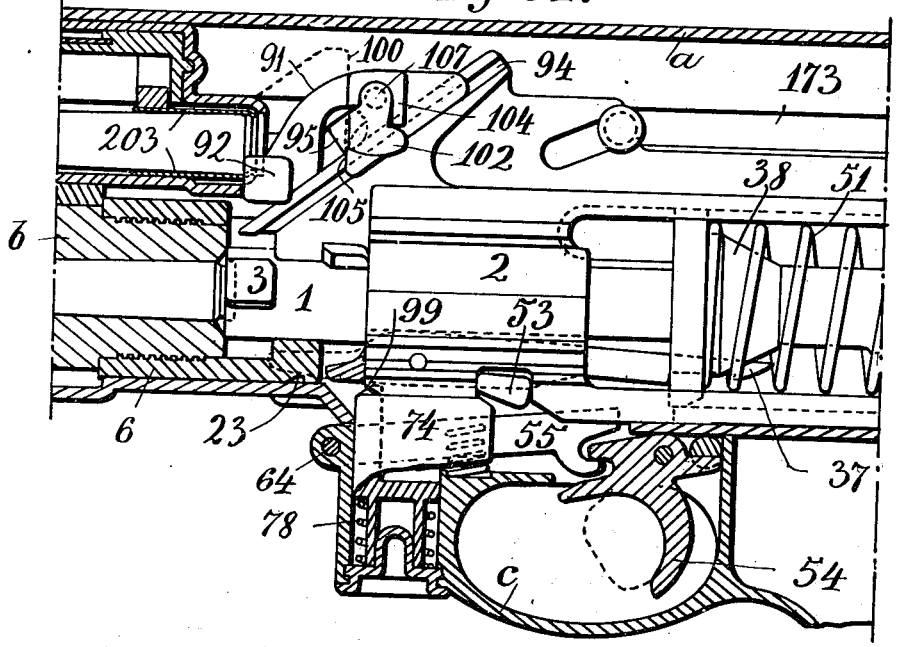

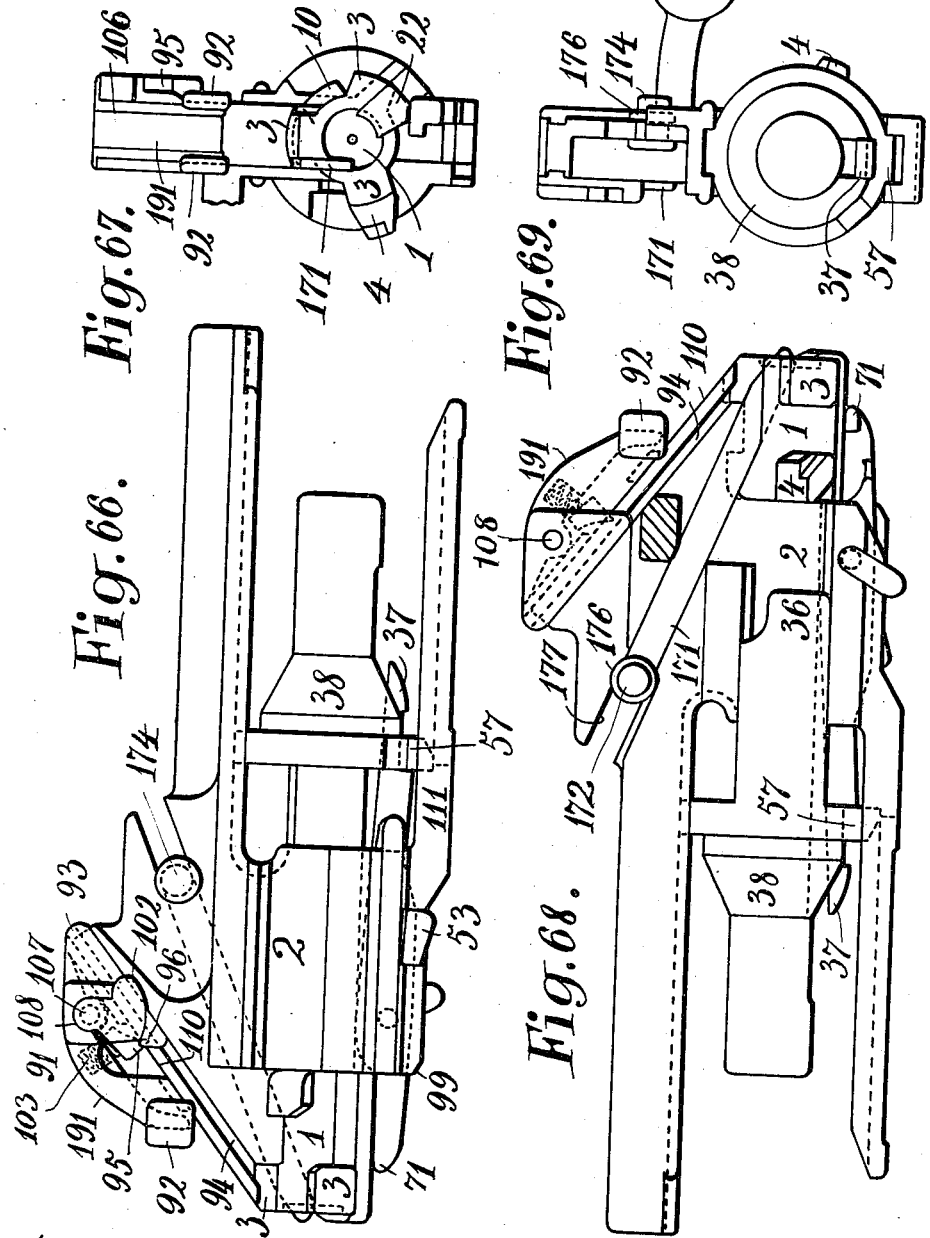

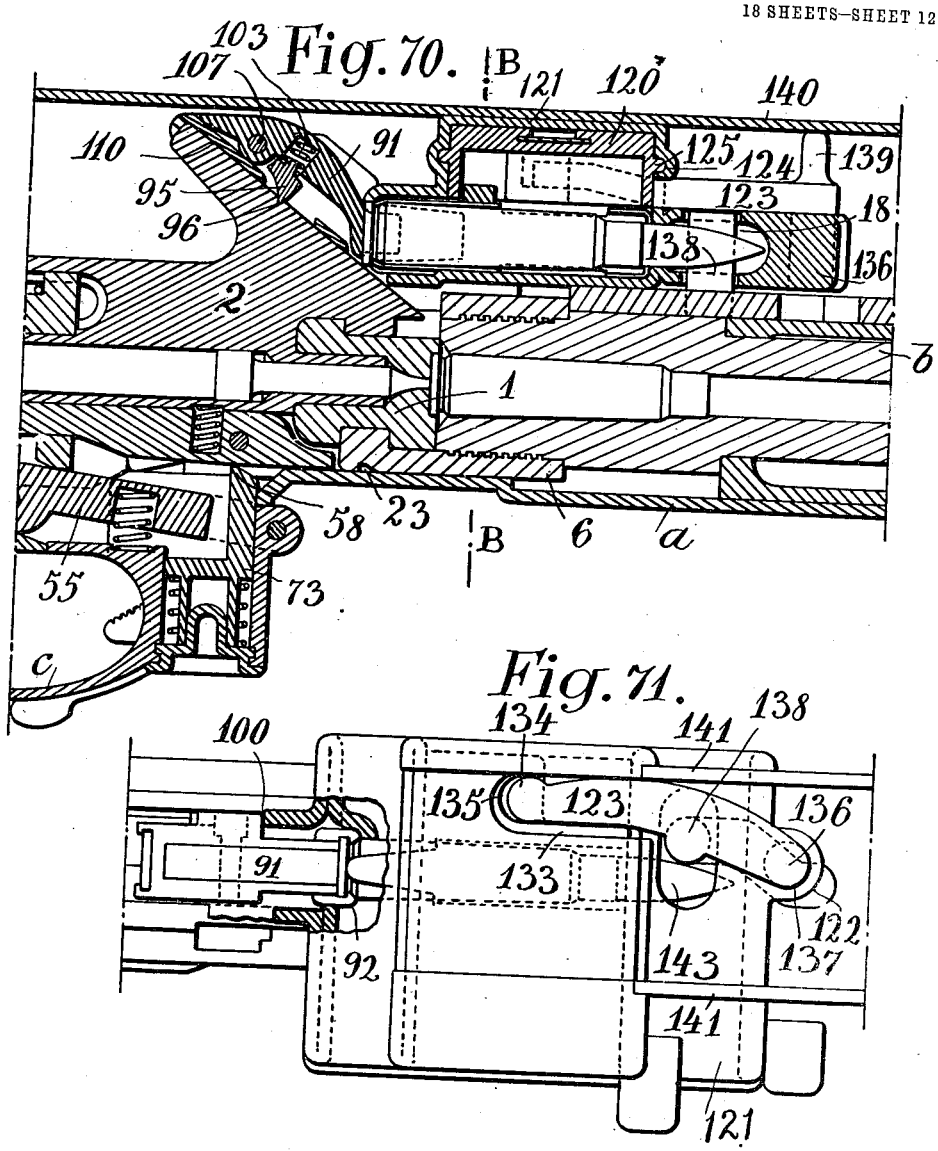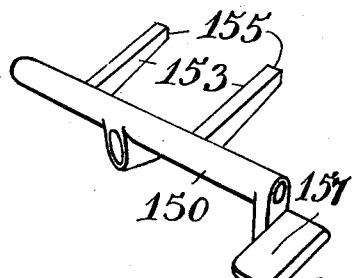

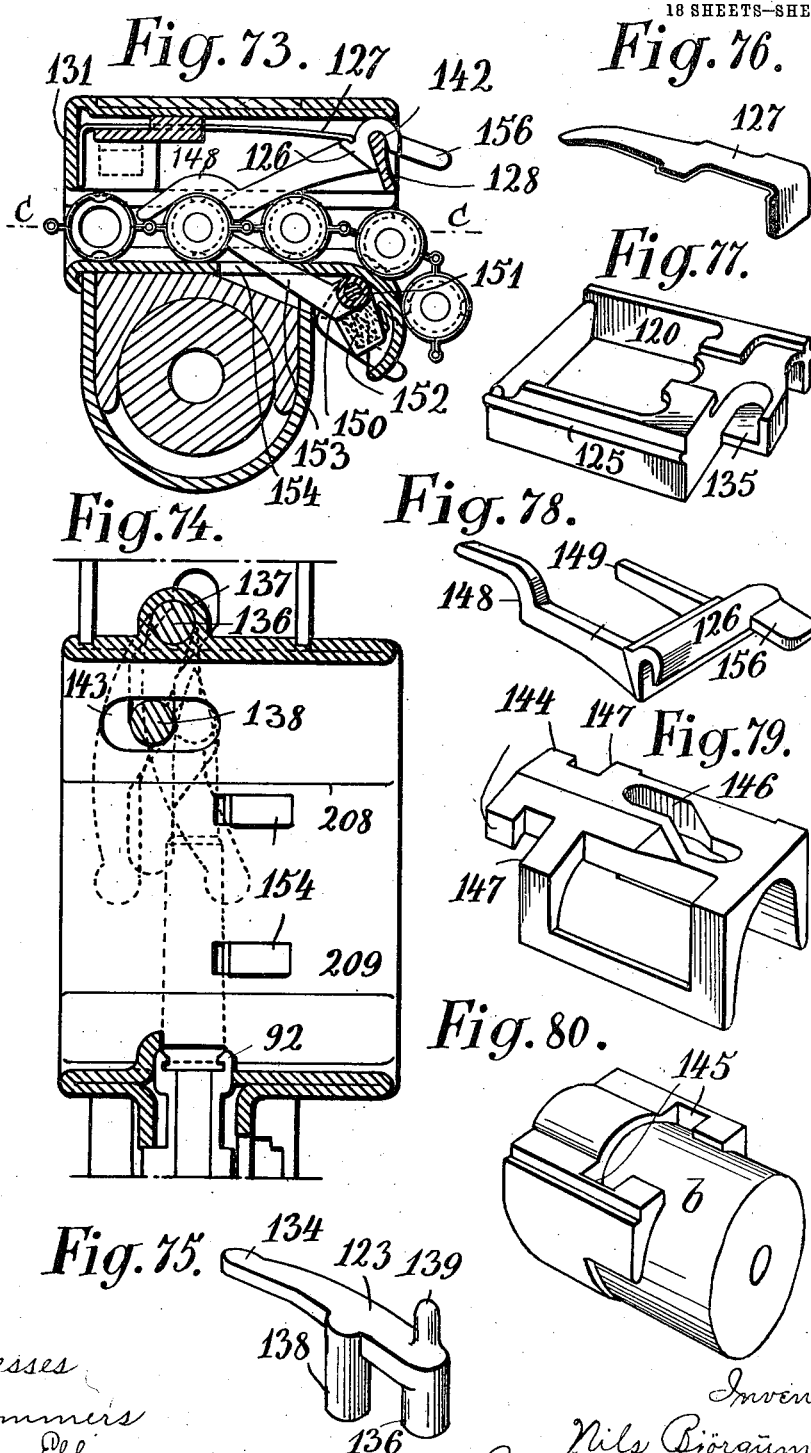

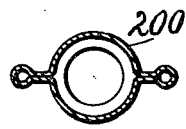
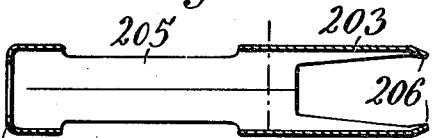
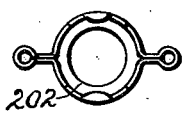
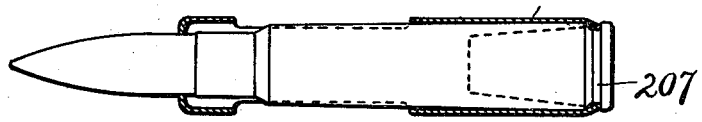
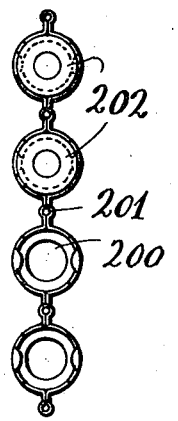
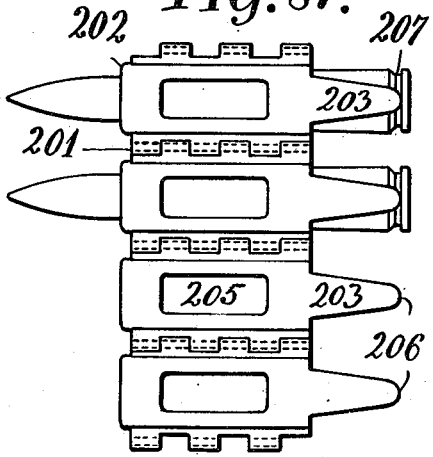
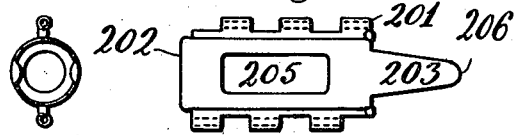

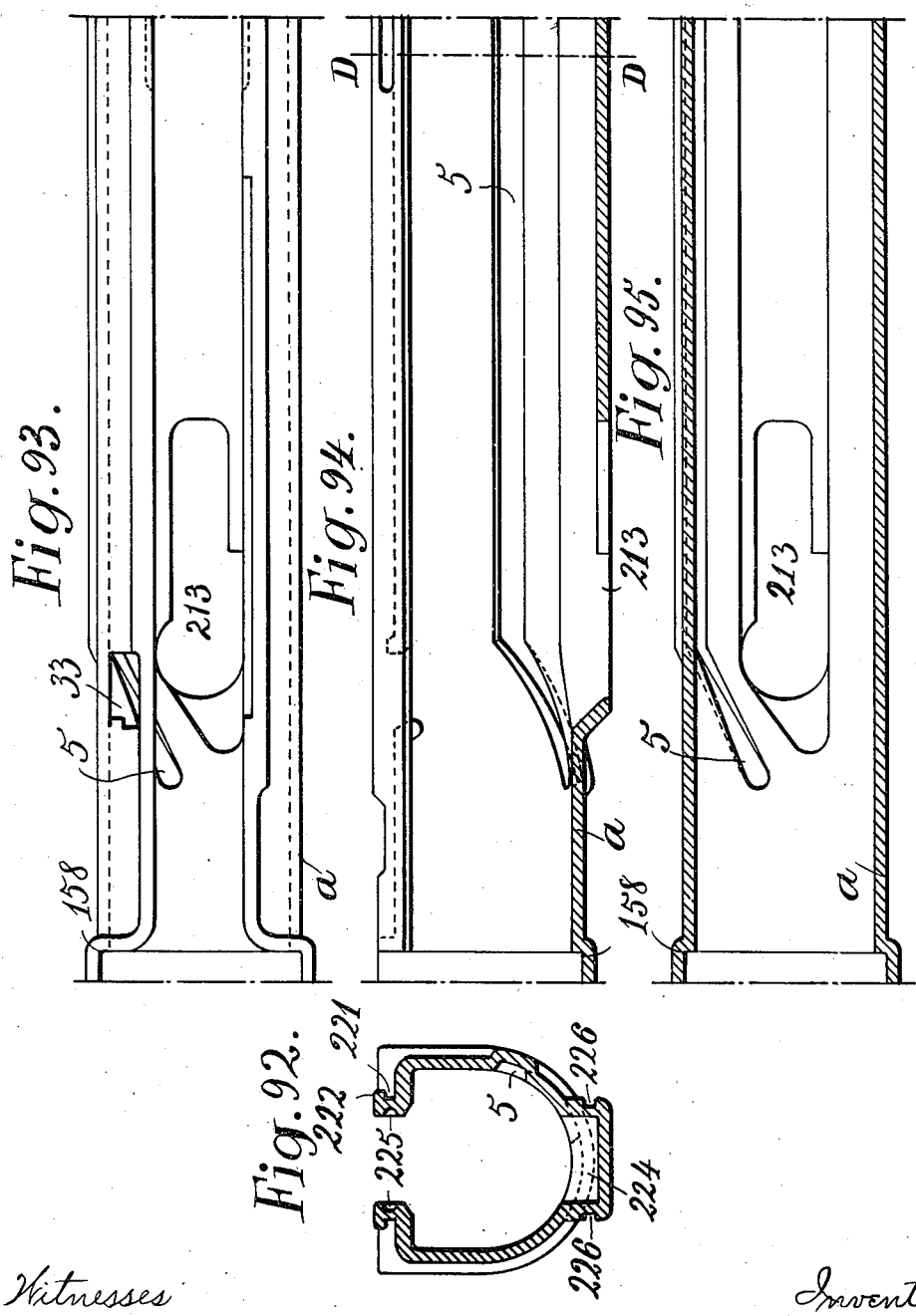

N. BJÖRGUM.
AUTOMATIC FIREARM.
APPLICATION FILED AUG. 22, 1910.

1,007,911.

Patented Nov. 7, 1911.
18 SHEETS—SHEET 17.

Witnesses
B. Sommers
May Ellis

Inventor
Nils Björgum
By Henry Orth Jr.
Atty

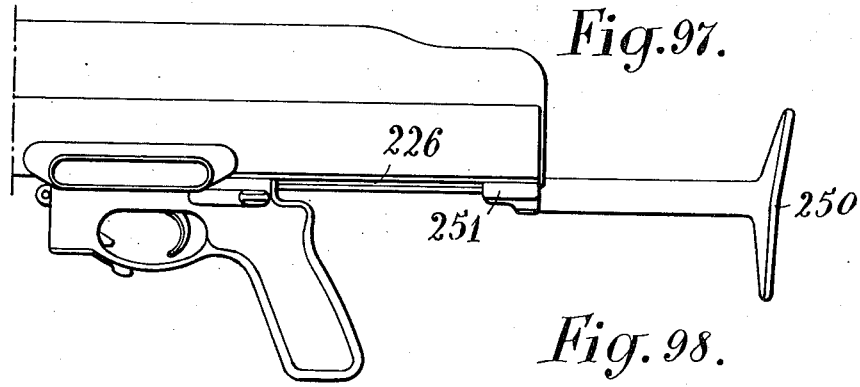
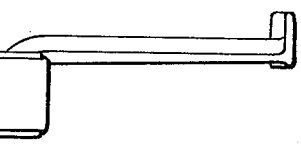
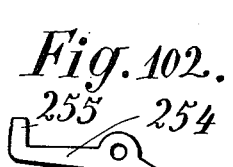
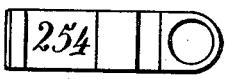
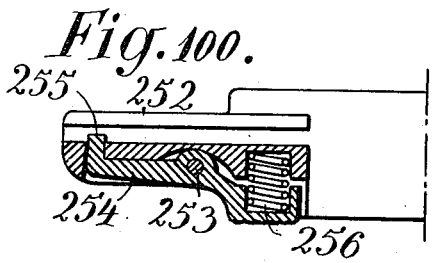
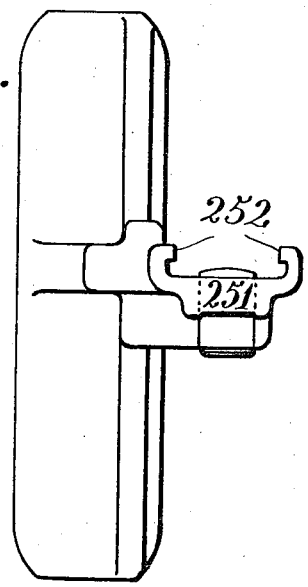
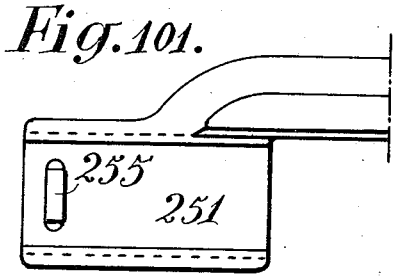

UNITED STATES PATENT OFFICE.

NILS BJÖRGUM, OF ASKER, NEAR CHRISTIANIA, NORWAY.

AUTOMATIC FIREARM.

1,007,911.  Specification of Letters Patent.  Patented Nov. 7, 1911.

Application filed August 22, 1910. Serial No. 578,442.

*To all whom it may concern:*

Be it known that I, NILS BJÖRGUM, a subject of the King of Norway, residing at Asker, near Christiania, Norway, have invented certain new and useful Improvements in Automatic Firearms; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to automatic fire arms of the kind, in which the barrel, when fired, is firmly closed by means of a rotatable breechbolt, having lugs coöperating with lugs on the barrel or on an extension of the same, so that the barrel and the breech-bolt in the first part of the recoil action travel together rearwardly, whereupon the barrel is released from the breech-bolt by a rotation of the latter and the breech-bolt allowed to continue its travel.

My invention relates to the several parts and mechanisms constituting an automatic arm, and whereas the invention is in the following description described especially in its application to a so called machine gun, the improvements may for the greater part also be applied to other arms for instance pistols and hand guns.

In the following I shall describe my improvements reference being had to the accompanying drawings which illustrate one form of my invention. In order to facilitate the description and the understanding of the several devices the figures of the drawings are grouped so that each group specifically refers to special devices or groups of devices; but although the drawings referring to a single group are sufficient for the understanding of the devices described under said group, reference may also be made partially be made to figures relating specifically to other groups of devices. In order to simplify the drawings the figures in each group as much as possible are limited to the devices described, the other devices being partly omitted or broken away.

Figure 90:
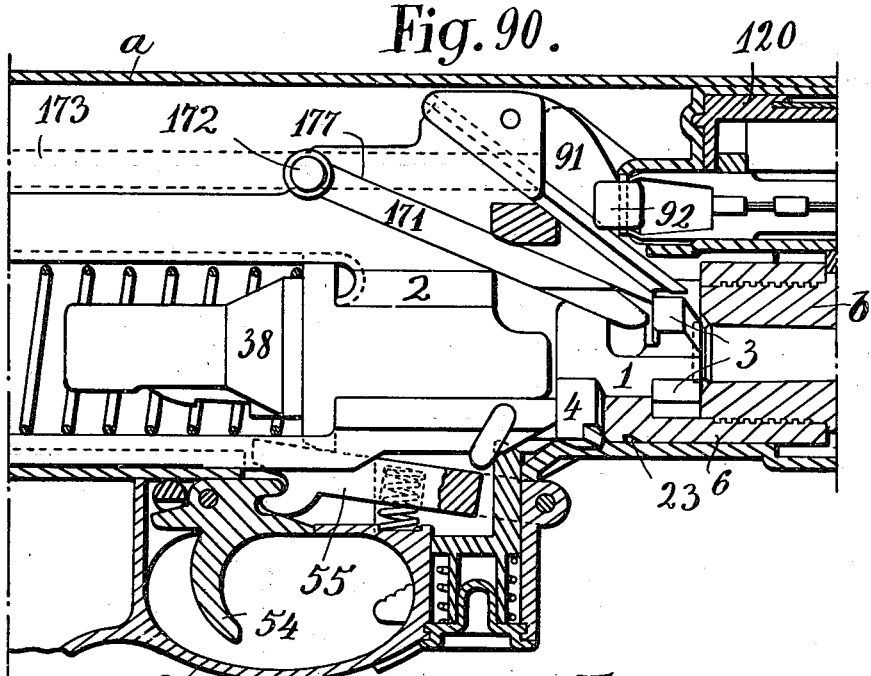
Figure 91:
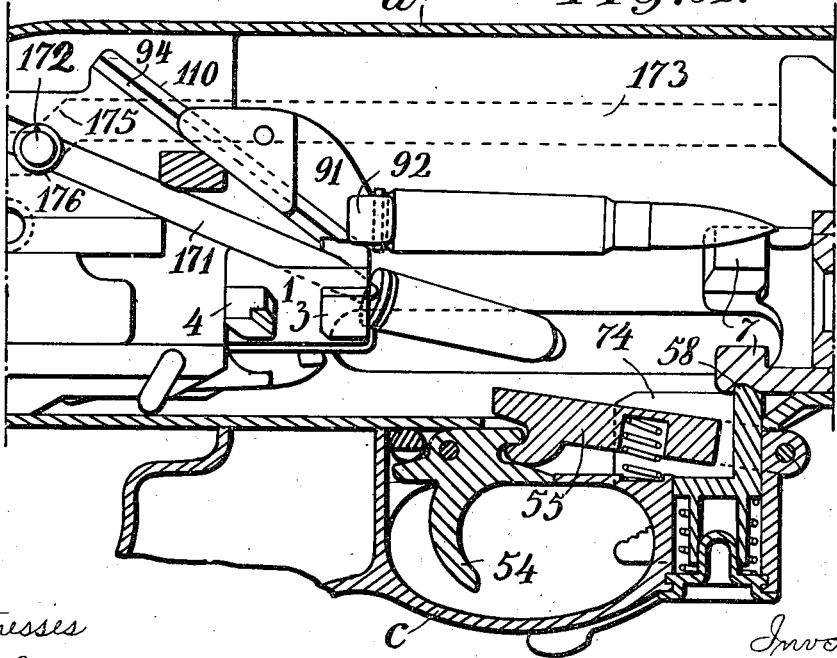
Figure 96:
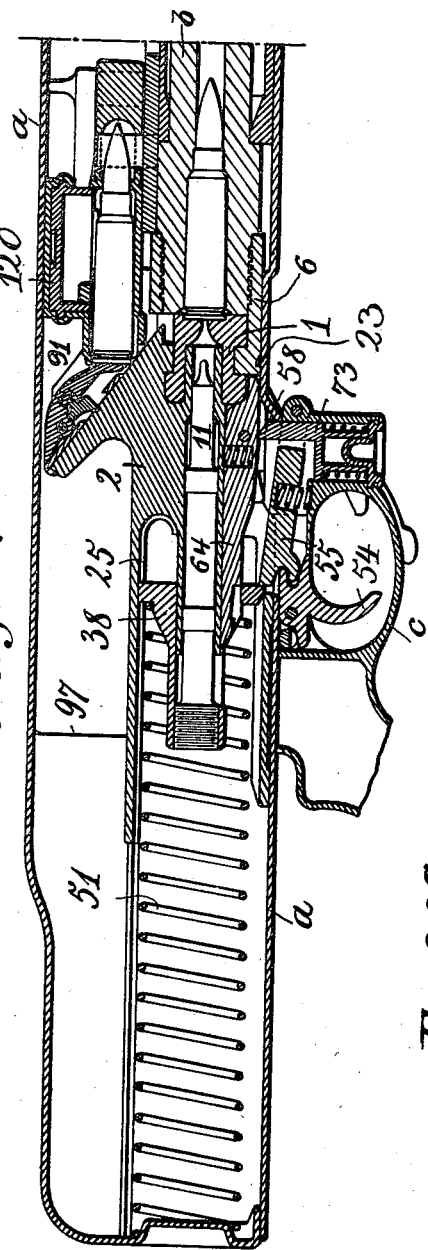
Figure 96A:
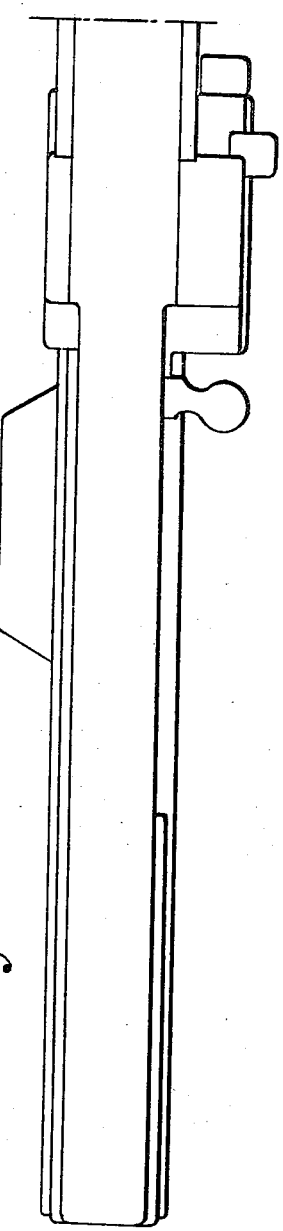

In said drawings—Figure 1 is a vertical longitudinal section through the rear part of the barrel and the front part of the breech bolt, showing the mechanism locked. Fig. 2 is a cross section on line II—II of Fig. 1. Fig. 3 is a horizontal section on line IV—IV of Fig. 4. Fig. 4 is a cross section on line III—III of Fig. 1. Fig. 5 is a view similar to Fig. 1, but showing the parts opened and the barrel in its arrested position. Fig. 6 is a cross section on lines VI—VI of Fig. 5. Fig. 7 is a horizontal section, showing the breech bolt in more retracted position. Fig. 8 is an end view of the barrel sleeve. Fig. 9 is a view like Fig. 1 but showing a modification applicable especially to pistols. Figs. 10 to 13 are views of the breech bolt head, Fig. 10 being a right hand view, Fig. 11 a front end view, Fig. 12 a rear view, and Fig. 13 a top view of Fig. 10. Figs. 14 and 15 are longitudinal section and cross section respectively of the breech locking mechanism as especially designed for hand guns. Fig. 16 is a detail longitudinal section. Fig. 17 is a cross section on the line XVII—XVII of Fig. 16. Fig. 18 is a longitudinal section of the breech part of the pistol in locked position. Fig. 19 is a detail. Figs. 20, 21, 22 and 23 are side view, rear view, top view and front view, respectively of the breech bolt head. Fig. 24 is a vertical longitudinal section through the breech part of a gun, showing the parts in locked position. Fig. 25 is a similar view showing the parts, when the barrel has its rearmost position and in the moment, when a new cartridge is being pressed into the chamber. Figs. 26, 27, 28 and 29 are detail views of the arresting piece looking from below, from the side, from above and from the rear respectively. Figs. 30 and 31 are detail views of the bottom piece serving to lock the stopping piece in position. Fig. 32 is a side view and vertical sectional view of the breech part of the gun showing the parts at rest, immediately after the firing of the gun. Fig. 33 is a similar view showing the position of the parts just before the barrel has ceased to recoil. Figs. 34 and 35 are side and end views respectively of the recoil lever. Figs. 36 and 37 are side and end views respectively of a portion of the barrel sleeve. Fig. 38 is a cross section on the line A—A of Fig. 32. Fig. 39 is a vertical longitudinal section through the breech casing, the parts being shown in the position they occupy in the moment the gun has been fired; the view is from the left hand of the gun. Figs. 40 and 41 are axial section and end view respectively of the cocking sleeve. Figs. 42 and 43 are top and side views respectively of the automatic sear or safety latch. Fig. 44 is a view like Fig. 39 but looking from the right hand side of the gun and showing the parts in cocked position ready for firing by hand. Figs. 45 and 46 are top and side views respectively of the firing sear (for hand firing). Fig. 47 is a top view of the trigger guard with parts connected therewith for firing the gun by hand. Figs. 48 and 49 are sectional side views (looking from the left) of the trigger and sear mechanism and connected parts, showing especially devices coming into operation when the breech is opened by hand, Fig. 48 showing the parts when the gun is locked and has been fired and Fig. 49 showing the parts during the opening operation. Figs. 50, 51, 52, 53 and 54 are vertical longitudinal sections through the breech portion of the gun showing the cartridge conveyer in operation at five different stages. Figs. 55, 56, 57, 58 and 59 are vertical section, bottom, side, top and cross section respectively of the conveyer. Figs. 60, 61 and 62 are bottom, side and top views respectively of the conveyer lever. Figs. 63, 64 and 65 are views from the left, from the end and from the right respectively of the retaining hook of the conveyer. Fig. 66 is a left hand side view, partially in section, of the whole breech bolt with parts carried thereon. Fig. 67 is a front end view of the same. Fig. 68 is a right hand side view similar to Fig. 66. Fig. 69 is a rear end view of the same. Fig. 70 is a vertical axial section through the feed box and the breech part of the gun. Fig. 71 is a top plan view (partially in section) of the feed box with the driving lever. Fig. 72 is a perspective view of the cartridge support. Fig. 73 is a cross section on the line B—B of Fig. 70, showing the feeding mechanism in its projected position, and the cartridge in position to be gripped by the conveying device. Fig. 74 is a horizontal section through the feed box on line C—C of Fig. 73. Fig. 75 is a perspective view of the driving arm. Fig. 76 is a perspective view of the pusher spring. Fig. 77 is a perspective view of the slide. Fig. 78 is a perspective view of the pusher. Fig. 79 is a perspective view of the guide piece for the driving lug of the driving arm. Fig. 80 is a perspective view of the end of the barrel showing the coupling hooks for the guide piece of the feeding mechanism. Figs. 81 and 82 are cross section and longitudinal section respectively of a member of the belt. Figs. 83 and 84 are end and side view respectively of a member of the belt. Fig. 85 is a longitudinal section through a belt member in which a cartridge is inserted. Figs. 86 and 87 are end and plan views respectively of a row of belt members, the upper two carrying cartridges. Figs. 88 and 89 are end and plan views respectively, of a single member drawn on a smaller scale. Fig. 90 is a vertical longitudinal sectional view of the breech showing the parts when the mechanism is locked. Fig. 91 is a similar view with the mechanism open and in the moment the shell is acted upon by the ejector and thrown out. Fig. 92 is a cross section through the breech casing frame on line D—D of Fig. 94. Fig. 93 is a top plan view of a portion of the same. Fig. 94 is a vertical longitudinal section through the same. Fig. 95 is a horizontal section. Fig. 96 is a central longitudinal vertical section of the rear end of the gun on a reduced scale. Fig. 96ᵃ is a top plan of the same. Fig. 97 is a side view of the hind part of a gun, and Fig. 98 is a top view of the arm rest and part of the gun. Fig. 99 is an elevation, looking from the front, of the arm rest on an enlarged scale. Fig. 100 is a vertical longitudinal section on the line D—D of Fig. 94. Fig. 101 is a top view of Fig. 100. Fig. 102 and Fig. 103 are a side view and top view of the latch.

My improved breech closing devices belong to the class having a locking member capable of a movement independent of the breech-bolt proper or slider. According to my invention the slider consists of a body with only rectilinear movement and carries at its front end a short locking head capable only of rotary motion relatively to the body of the breech-block. The barrel may have long or short travel, but when it reaches the end of its travel and is released from the locking head, it is arrested and remains at rest until the breech-bolt returns and again brings it to its forward position. It will be understood that the movements of the breech-bolt and its head are exactly alike backward and forward, only that they are reversed. The breech-bolt comprises a head 1 and a slider 2, the latter having a rectilinear movement in the breech casing and the former a rotatory movement on the slider 2.

The breech-bolt head 1 is provided with three locking lugs 3 and a guiding lug 4, (Figs. 10 to 12) which latter projects into a groove 5 (Figs. 4, 6 and 7) in the breech casing or frame $a$.

6 designates a sleeve screwed on the rear end of the gun barrel $b$, and provided with three lugs 7 corresponding with the lugs 3 on the breech bolt head, so that the latter lugs may be moved axially past the lugs 7 and then by a rotatory movement of the breech-bolt head be turned so that they come in front of the lugs 7, thereby effecting the locking up of the breech.

The breech-bolt head 1 fits onto a hollow pin 8 forming the front end of the slider 2, so that the head may turn on said pin. The slider also has a recessed portion 9, into which fits a lug 10 formed on the head so that an axial movement of the head is prevented, when the head is so turned that the lug 10 lies in the recess 9 (see Figs. 1, 5, 6, 9).

The sleeve 6 on the barrel is provided on its rear end with a cam face 19 (Figs. 5, 8 and 14), which coöperates with a similar cam face 20 (Figs. 7 and 13) on the guide lug 4 of the breech-bolt head and corresponding cam faces 21 are provided on the inner sides of the lugs 7 of the sleeve 6.

The operation of the breech bolt in its unlocking and locking movement is as follows:—When the arm is fired the barrel together with the breech-bolt (comprising slider and head) is pushed rearwardly, the lug 4 moving in the groove 5 in the frame $a$, which groove in its front part is spiral, so that it will cause the breech-bolt head 1 to be turned during this first part of the backward movement; when the point is reached where the groove commences to run in an axial direction, the barrel is unlocked from the breech bolt head and the barrel then stops moving (by means of a special arresting mechanism, which will be hereinafter described). The lugs 3 on the head are now free from the lugs 7 on the sleeve 6, and the breech-bolt continues its backward motion. The cam face 19 on the sleeve 6 during the rotation of the breech-bolt head causes a small axial displacement between the barrel and the breech-bolt, the object of which is to cause a gentle loosening of the cartridge shell before it is torn out by the violent backward movement of the breech bolt. The extractor 22 is secured to the slider 2 as shown in Fig. 14. During the continued backward movement of the breech-bolt the barrel remains at rest in the position shown in Fig. 5 and when the breech-bolt returns the breech-bolt head will again enter the sleeve 6 on the end of the barrel and locking takes place during the period the guide lug 4 moves in the spirally formed portion of the groove 5. The movement of the parts during the unlocking and the locking period is therefore exactly the same, only that they follow in the reverse order. This fact and the feature that the slider itself has only a rectilinear movement are characteristic points in my invention.

Referring now more particularly to Figs. 24 and 31 I shall describe the means for stopping and arresting the barrel at the moment when the breech bolt head is freed from its grip of the lugs on the barrel sleeve 6. In a cylindrical pocket in front of the trigger guard $c$ is provided a vertically movable arresting piece 73, which at the top has a lug 58 corresponding with a notch 23 in the sleeve 6. At one side the piece 73 has a wing 74, terminating at its lower end in a lug 79, which projects into the trigger guard so that the arresting piece 73 may be pulled down and thereby the barrel disengaged from the arresting piece by hand. The lower portion of the arresting piece is cylindrical and hollow, fitting over a central projection 76 on the bottom piece 77. A spiral spring 78 serves to press the arresting piece upwardly. It will be seen, that when the barrel recoils, the notch 23 snaps over the lug 58 and thereby the barrel is arrested. When the slider 2 again moves forward a lug or inclined face 99 on the slider hits the top of the wing 74 on the arresting piece 73, and thereby presses the latter down, so that it is disengaged from the notch 23 and the barrel thereby made free to move forward. When the barrel recoils, it is important that the shock or stroke of the barrel against the stationary parts be reduced as much as possible, so that the mechanism will act safely and the shooting be performed without unnecessary vibration of the gun; it is also important to have the stroke transferred to the parts continuing the sliding movement in a suitable manner. The means employed to perform the above named functions are shown in Figs. 32 to 38. I provide a two-armed recoil lever, having one arm 32 pointing upwardly through a gap in the breech casing $a$ and another arm pointing downwardly as shown in Fig. 32. The recoil lever is pivoted on a pin 31 journaled in a rearwardly projecting lug 33 on the barrel sleeve 6. When the barrel recoils, the arm 32 of the recoil lever hits on the face 35 in the aforesaid gap of the breech casing whereby the lever is rocked on its pivot and the arm 34 of said lever presses on the lug or projection 36 of a sleeve 38, which is connected with the striker or firing pin 11 and serves as a cocking piece for the latter. These parts are thereupon arrested, but this will be explained when describing the trigger mechanism and parts connected therewith. The slider 2 with the firing pin 11 in its cocked position now continues to move backwardly, a recoil spring 51 also serving as firing spring, being thereby compressed. By the resistance exerted by the recoil lever during its action, the momentum of the barrel will have been greatly diminished, so that it may now come to rest against the arresting lug 58 without great shock and without causing vibration to any great extent. When the parts return, the recoil lever will, with its arm 32, hit a face 39 in the gap of the breech casing and be turned back to its original position, shown in Fig. 32. A great advantage of the described recoil transmitting device is that the initial movement of the recoil lever is small and increases gradually, so that the shock will be very slight.

Referring now more particularly to Figs. 39 to 49 I shall describe the trigger mechanism and parts connected therewith. The firing-pin 11 is provided at its rear end with a screw-threaded head 62 by means of which it is firmly united with the cocking piece or sleeve 38. The latter is slidably mounted on a tubular part 24 of the slider 2 and is prevented from rotation by means of a lug 63, traveling in a guideway 25 in the slider. The cocking sleeve 38 has a lug 57, on its lower side serving as a shoulder for the sear arm 55, and said sleeve has at its front on the right hand side a projection 36 the front face of which is acted upon as above described by the arm 34 of the recoil lever (Fig. 33) whereby the mechanism is cocked. A safety latch or automatic sear arm 64 is fulcrumed at 65 on the lower side of the slider 2. At its rear end this arm is notched as shown at 37 and said end projects into a slot 34′ Fig. 44, in the cocking sleeve; a spiral spring 66 presses the rear end of the sear arm downwardly. When the gun has been fired and the cocking sleeve 38 is moved rearwardly (Fig. 44) the rear notched end 37 of the sear arm will be pressed into engagement with the front face of the cocking sleeve and the latter will then be prevented from returning until the sear arm has been released (its rear end raised again). This is done in the following manner: The sear arm has a lug 53 with a cam or wedge face on its lower side. When this lug hits the top face of the wing 74 of the barrel arrester 73, it will press the rear end of the sear arm up to the position shown in the drawings, whereby the cocking sleeve is released from the sear arm and firing takes place automatically, in case the trigger 54 is pulled. It will from the above be seen, that accidental firing cannot in any way take place, before the breech has been locked. The trigger 54 engages by means of corresponding lugs the sear 55, which is acted upon by the spring 56. The trigger has a rearwardly projecting arm 69 and above the same is mounted a pin 70, which is recessed at 68, thereby leaving space for the working of the trigger; when the pin is turned 90 degrees, it arrests the trigger so that firing cannot take place. At its forward end the automatic sear arm 64 is provided with an extension, having a lateral lug 71, Figs. 42 and 43. The object of this lug is to serve as means whereby the barrel may be taken backward with the slider, when the mechanism is opened by hand. It will be seen that the lug 71, when the mechanism is closed, is situated in front of a lug 72 on the barrel sleeve 6; when the slider 2 is drawn backward, it will engage the lug 72 and draw the barrel along with it until it is released at the moment when the automatic sear arm 64 is tipped to the position shown in Fig. 49 by its spring, thereby arresting the cocking sleeve as clearly seen in Fig. 49.

The lug 71 is lifted by this tipping motion of the sear-arm sufficient to get clear of the lug 72. The just described arrangement greatly simplifies the mechanism as no special devices are necessary for manipulation by hand. The cartridge feeding mechanism comprises a feeding belt, and a cartridge gripping and conveying device, which latter carries the gripped cartridge into position for being driven home into the chamber of the barrel. Systems of automatic guns are known, in which the gripping and conveying device for the cartridges operates so that the cartridge remains in the holder while it is being fired. This must be considered as a faulty construction, it having among other drawbacks, the disadvantage that the breech locking device is thereby weakened and made less safe. Devices of this kind are also quite complicated and it is difficult to start the operation of the conveying device as the coöperation of the same with the barrel is only effected when the barrel is driven rearwardly by the recoiling action of firing. By my improved device for conveying the cartridge from the belt to the chamber the cartridges are conveyed in a horizontal position by the gripping device which when the cartridge is in its place is withdrawn from the same giving place to the breech locking devices. By these means a safe transport of the cartridges is attained and at the same time a very strong central locking of the breech is secured.

Figure 53:
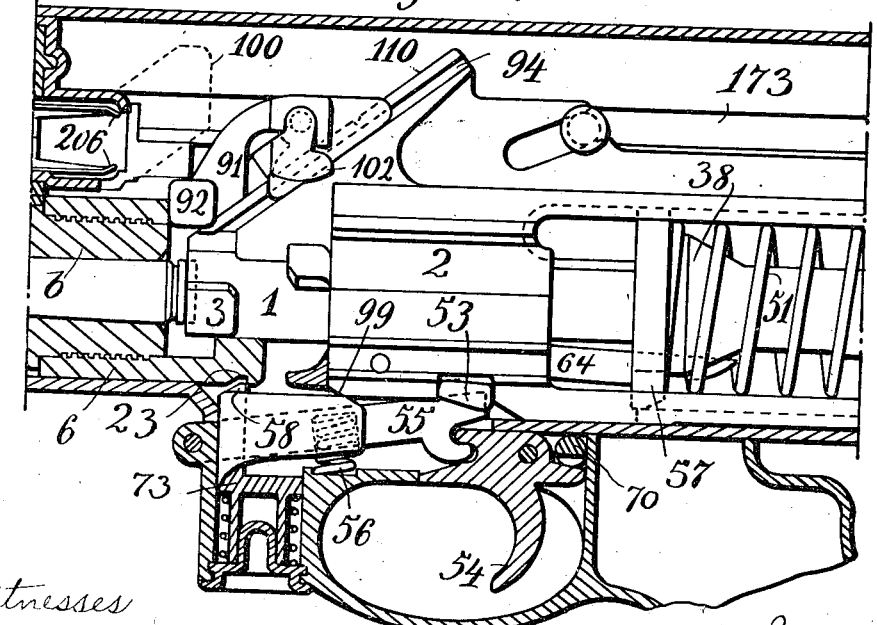

In the following description special reference is had to Figs. 50 to 69 and Fig. 96. The cartridge conveyer comprises a slide 91 supported on an inclined bed 110, having on its side, grooves 94 corresponding with guide ribs 93 on the slide. The slide ends in a forked head having gripping ribs 92 on each side adapted to fit over the end of the cartridge. Between the sides of the slide is mounted a lever 191, Figs. 60 to 62, fulcrumed on a pin 107. This lever projects with its lower end into the forked head of the slide and serves to press on the head of the cartridge so as to steady it. The pin 107 on which the lever is fulcrumed forms part of a retaining hook 95 and is inserted into a hole 108 in the slide. This retaining hook has on its side a lug 102 and a spiral spring 103, inserted into a cavity in the lever 191 (Fig. 66) presses against the top of the hook, said top being provided with a projection 109 for the purpose of steadying the spring. The hook is caused in this way to bear against the bed 110 and when sliding on the same engages a notch 96 in the bed 110 (Figs. 52 and 66) whereby the slide is arrested. The operation is as follows:— Provided the gripping ribs 92 have taken hold of a cartridge, as shown in Fig. 49, the cartridge will, by the recoiling movement of the mechanism, be carried straight backward until its front end is in rear of the feed box. In this movement the lug 102 of the retaining hook hits a vertical part 97, Fig. 96, of the frame or breech casing $a$ whereby the hook 95 is lifted out of the notch 96, releasing thereby the slide so that it commences sliding down the bed 110 (Fig. 50). The cartridge now is lowered vertically, while the breech-bolt slider 2 continues to move rearwardly until the cartridge, as shown in Fig. 51, is brought in line with the bore of the gun in front of the breech-bolt head. When the breech-bolt thereupon is pressed forward by the recoil spring the cartridge is pushed home, held in horizontal position by the gripper (Fig. 52). A shoulder 105 on the slide, during the last stage of said forward movement, hits on the rear face of the barrel sleeve 6 whereby the forward motion of the slide is stopped and it is forced to move upwardly as shown in Figs. 52 and 53, sliding on the bed 110 until it is free of the cartridge. At this moment the incline 99 on the breech-bolt slider 2 has depressed the lug 58 of the arresting piece 73 so that the barrel is free to move forward together with the breech-bolt. The slide takes part in this horizontal movement, and then the shoulder 105 on the slide 91 hits a vertical face 100 (indicated in dotted lines) provided on the cartridge feeding box, and by the continued forward movement of the breech bolt, said slide is lifted vertically by the wedge action of the bed 110 so that it grips a new cartridge as shown in Fig. 54. The cartridge feeding belt is caused to move intermittently by a slide mounted in transverse guides in a box above the rear part of the barrel. For transmitting the movement of the barrel to this slide I provide a lever which has its fulcrum on said box and has a lug engaging an oblique slot in a member connected with the barrel and another lug having engagement with the slide. This arrangement secures a simple transmission of the movement and a quiet and steady working of the mechanism.

Referring particularly to Figs. 70 to 80, 121 designates a feed box secured to the breech casing or frame of the gun by means of ribs 141 on the frame and by the cover 140 of the breech casing which extends above the feed-box between offsets in its top. The box may be made of metal plate properly formed by pressing. A projection 122 at the front end of the box has a vertical bore 137, serving as bearing for the fulcrum pin 136 of the driving arm 123. The box is provided at 124 with transverse grooves serving as guides for the ribs 125 of the slide 120. The latter is formed with an open space in the middle giving room for the pusher, Fig. 78, and its spring 127. This pusher has two arms 148 and 149, the latter of which abuts against the cartridge and the former resting with its bent end on the top of the cartridge or the cartridge housing of the belt (Fig. 73). The pusher rests with its grooved end 126 on top of a rounded rib 142 on the side of the slide and is capable of a rocking motion. The spring 127 keeps the pusher in place. The slide with the pusher and spring is pushed in position from the right and abuts on the left side against the side plate 131 of the breech casing, the recess 135 of the slide being in this manner brought right underneath the slot 133 in the top of the feed box. The driving arm 123, Fig. 75, is placed into this slot, so that its rounded end 134 enters the recess 135 of the slide, whereby the movement of the slide is limited to the other side. The driving arm 123 has its fulcrum 136 in the bore 137 and is provided on the lower side with a lug 138, which serves to transmit movement from the gun barrel to the slide. This lug projects through a slot 143 in the feed box and is so disposed, that it will just touch the side of the projectile, when this is in proper loading position, thereby securing a precise position of the cartridge relatively to the gripper 91. The driving arm is secured in its position by a lug 139 on top of the arm 123, said lug projecting to the under side of the cover 140. The lower end of lug 138 enters an oblique recess or slot 146 in a guide piece, Fig. 79, which is placed on top of the barrel and is held from longitudinal movement on the same by means of lugs 144, entering corresponding recess 145 on the barrel $b$ Fig. 80. The oblique slot 146 in the guide piece terminates in rectilinear ends, so that the feeding movement is accomplished a little while before the barrel comes to rest at its forward movement, the gripper 91 having opportunity to fetch a cartridge, before the backward movement commences. The just described manner of operation secures a quiet transmission of the recoil motion to the feeding mechanism and a continual control of the position of the driving arm. The arrangement also allows of an easy shifting of the barrel. When the cover of the breech casing is taken off, and the guide piece removed, the barrel may be taken out together with the recoil spring and the breech mechanism. The guide piece also serves as a means for limiting the rearward motion of the barrel, its faces 147 abutting against vertical offsets 158 on the breech casing (see Fig. 93). As will be understood, the transverse movement of the slide which is imparted by means of the driving arm 123 whose end 134 projects into the pocket 135 on the slide, in its turn imparts feeding movement to the cartridge belt by means of the pusher. Below the cartridge belt is placed an oscillatory support 150 (Fig. 72) for steadying the cartridges during the feeding movement. This support oscillates on trunnions 151, Fig. 73, and is pressed upwardly by a spring 152; said support having arms 153 projecting through openings 154 in the bottom of the feed box. On account of the yielding nature of the support the arms 153 will be depressed each time a cartridge passes above them and thereupon they will be thrown upward by the spring and, as shown in Fig. 73, come at rest with their flat ends 155 in contact with the cartridge. The cartridge support and the pusher have thumb-pieces 157 and 156, respectively, by means of which they may be moved by hand. The cartridge feeding belt carries the cartridges laterally into the feed box and serves as a steady support for the cartridge, when it is brought in position for being gripped by the conveyer, which takes it to the chamber, and allows an easy removal of the cartridge from the belt in the axial direction of the cartridge by the conveyer. Cartridge-belts of known construction do not in every respect fill these requirements, and my invention relates to improvements, whereby a cartridge belt is obtained, wholly made out of metal plate and provided with means securing the correct position both during transportation and during the feeding operation. The belt is so constructed that it is at the same time light and strong so that very little force is necessary for pulling the cartridges out of the belt.

The feeding belt shown in Figs. 81 to 89 consists of tubelike members 200, which by means of hinges 201 are united to form a continuous belt of any desired length. The main part of the belt members is cylindrical with slits or openings 205 for the sake of making the belt as light as possible. At the front end the metal is bent to form a flange 202 fitting closely around the projectile and thereby steadying it. At the rear end arms 203 are formed having inwardly bent lips 206, which snap into the groove 207 of the cartridge. These arms form spring latches, which keep the cartridges in a correct position. In order that the feeding belt shall be strong and durable and unaffected by climatic variations, it is made of tubes or metal plate, bent and pressed to correct form. The belt, when moved through the feeding box 121 is guided partly by the rib 208, Fig. 74, steadying the front part of the belt members and partly by the inside face 209 of the rear wall of the feeding box, the cartridge moving in contact with said face.

The shell ejector is shown in Figs. 90 and 91. The ejector consists of a rod 171 resting in an oblique groove 177 in the breech bolt slider 2 as clearly seen in Figs. 66 and 68. The upper part of this groove ends in a slot in which a pin 174 on the upper end of the ejector works. This pin has a collar 176 which prevents lateral motion of the ejector. In line with said pin, but on the other side, the ejector rod carries a lug 172, which enters a long groove 173, Fig. 39, in the side of the breech casing. This groove has an inclined offset at 175. When the slider travels backward, this offset will cause the ejector rod to be thrown violently forward thereby ejecting the shell.

I prefer to construct the breech casing, shown in Figs. 92 to 95, out of steel plate bent and pressed to form. This will give a cheap and light but at the same time accurate and strong frame for the mechanism of the gun. The breech casing is made of two parts, the breech casing bottom or frame and the cover or top part. The breech casing frame comprises a crib-shaped body having inwardly bent flanges at the top terminating in a rib 222, forming at the outside a groove 221, corresponding with a rib on the cover, so that the latter may be slid on the frame from the rear. At 158 there is an offset in the frame, forming the before mentioned face against which the barrel recoils and is stopped in its backward motion. The guide lug 4 on the breech-bolt head travels in the groove 5. The bottom of the frame in rear of the offset 158 is pressed to the shape of a long groove 224, in which the breech-bolt slider 2 travels, it entering this groove with its faces 111 (Fig. 66). In the forward part of this groove there is cut out a slot 213 for the trigger and for the barrel arresting mechanism. On the inner sides of the ribs 222 there are grooves 225 corresponding with guide ribs on the slider. The slot 33 is provided for the cocking lever. The grooves 226 (Fig. 92) are provided for fixing the trigger guard. The form and arrangement of the breech casing frame and cover will need no further description as the other drawings show the same clearly.

Referring to Figs. 97 to 103 I shall describe my improved arrangement of arm rest. The arm rest 250 shown in Figs. 97 to 103 terminates at its front end in a bracket 251, having on its top edge ribs 252 corresponding with the grooves 226 on the breech casing as shown also in Fig. 92. On the lower side of the bracket is pivoted at 253 a latch 254, having a nose 255 adapted to engage notches (not shown) in the lower side of the breech casing. A spring 256 actuates the latch. By this arrangement I am able to regulate the position of the arm rest as shown in Fig. 97.

Fig. 9 illustrates a modified form of safety latch or automatic sear. This modification consists in providing on the firing-pin 11 a downwardly projecting arm 12. On this arm is provided a forwardly projecting lug 15, having a cam face 16 on its front end: When the breech-bolt head 1 is turned to lock the breech, the lug 15 projects between the lug 4 and the lug 10 on the bolt head; but when the head is turned to unlock the bolt the lug 15 will hit against the lug 4 on the head and the firing-pin will thereby be held in a withdrawn position.

What I claim is:

1. In an automatic fire-arm, the combination with a recoiling barrel, of means for arresting it at a point in front of the cartridge feed-way, a breech-bolt comprising a slider capable only of a rectilinear motion, and a head capable only of a rotatory motion relatively to the slider, means for interlocking the breech-bolt head with the barrel, and means for rotating the head during the barrel recoil, the rotary movement of the head during the forward movement of the slider being the reverse of that imparted to the head during the backward movement of the slider.

2. In an automatic fire-arm, the combination with a recoiling barrel, of means for arresting the same at a point in front of the cartridge feed-way, a breech bolt comprising a slider capable of a rectilinear motion only and a head thereon capable of a rotary motion, interlocking lugs on the head and barrel, a guide-lug on the head engaging a slot in the breech-casing, said slot having a spiral front portion to impart a rotary movement to the head during the barrel recoil and a reverse rotary motion during the forward movement of the barrel, and a straight rear portion to prevent rotary motion.

3. In an automatic fire-arm, the combination with a recoiling barrel and means for arresting the same at a certain point of its travel, of a breech-bolt comprising a slider capable of a rectilinear motion only and a head thereon capable of a rotary motion, interlocking lugs on the head and barrel, a guide lug on the head engaging a slot in the breech-casing, said slot having a spiral front portion to impart a rotary movement to the head and a straight rear portion to prevent rotary motion, said barrel having a cam face coöperating with a cam face on the guide lug to cause a slight axial displacement between the barrel and breech-bolt.

4. In an automatic fire-arm, the combination with a recoiling barrel and means for arresting the latter, of a breech-bolt comprising a slider capable only of rectilinear motion and a head capable of rotary motion relatively to said slider, a striker in the breech bolt, a cocking piece carrying the striker, and a recoil lever interposed between the barrel and cocking piece adapted to move the latter into cocked position.

5. In an automatic fire-arm, the combination with a recoiling barrel and means for arresting the latter, of a breech-bolt comprising a slider capable only of rectilinear motion and a head capable of rotary motion relatively to said slider, a striker in the breech bolt, a cocking piece carrying the striker, a two-armed recoil lever pivoted on the barrel having one arm interposed between the cocking piece and barrel and the other arm adapted to be depressed by the breech casing, when the barrel recoils, and retract the cocking piece.

6. In an automatic fire arm, the combination with a recoiling barrel and means for stopping and arresting it at a certain point of its travel, of a breech bolt comprising a slider capable of a rectilinear motion and a head capable only of a rotatory motion relatively to said slider, a striker disposed in the axis of the breech bolt, a cocking piece fixed to the rear end of the striker, a forwardly projecting lug on the cocking piece, a two armed cam lever on the barrel, having one arm interposed between said lug and a face on the barrel and another arm projecting into a slot in the breech casing, means for automatically arresting the cocking piece in its retracted position and means automatically releasing it, when the breech bolt has attained its locking position.

7. In an automatic fire arm the combination with a recoiling barrel and means for stopping and arresting it at a certain point of its travel, of a breech bolt comprising a slider capable of a rectilinear motion and a head capable only of a rotatory motion relatively to said slider, a striker disposed in the axis of the breech bolt, a cocking piece fixed to the rear end of the striker, a forwardly projecting lug on the cocking piece, a two armed cam lever on the barrel, having one arm interposed between said lug and a face on the barrel and another arm projecting into a slot in the breech casing, an automatic sear device, comprising a spring actuated sear pivotally mounted on the breech bolt, a notch on the sear and a nose on the cocking piece, capable of engaging said notch, thereby arresting the cocking piece in cocked position, a cam face on the sear and a corresponding face on the stationary part of the gun for releasing the sear.

8. In an automatic firearm in combination, a recoiling barrel having near its rear end a notch, a breech bolt capable of being interlocked with the barrel, a striker disposed in the axis of the breech bolt, a cocking piece fixed to the rear end of the striker, a forwardly projecting lug on the cocking piece, a two armed cam lever on the barrel, having one arm interposed between said lug and a face on the barrel and another arm projecting into a slot in the breech casing, a spring actuated latch piece inserted in a pocket in the frame of the gun, having a latch nose adapted to enter the notch on the barrel and having also a wing forming on its top side a cam face, an automatic sear device comprising a spring actuated sear pivotally mounted on the breech bolt, a notch on the sear and a nose on the cocking piece, capable of engaging said notch, thereby arresting the cocking piece in cocked position, a cam face on the breech bolt and a cam face on the sear, said cam faces being in turn adapted to engage the cam face on the wing to depress the barrel latch and to lift and thereby release the sear.

9. In an automatic fire arm the combination with a barrel, of an arresting latch, having a main cylindrical body, carrying at its top a latch nose and a rearwardly projecting wing, and having a hollow cylindrical extension of less diameter, of a pocket forming a guide for the body of the latch and a removable bottom or cover for said pocket, said cover having a central cylindrical projection forming an auxiliary guide for the latch, and a spiral spring inserted between the said cover and an off-set on the latch and surrounding said cylindrical extension of the latch.

10. In an automatic fire arm, a breech bolt comprising a slider, capable only of rectilinear motion and a head capable of rotatory motion relatively to said slider, said head having lugs engaging lugs on the barrel and a lug taking into a recess on the slider, a lug on the head engaging a slot in the breech casing for steering and imparting rotary motion to the breech-bolt head in such manner, that the head will have the same radial position in its backward as in its forward movements at all points of said movement.

11. In an automatic firearm a breech bolt having a head capable of rotary motion relatively to the bolt and having front lugs and rear lugs and a neck portion of a length corresponding to the length of the locking lugs on the barrel, the front and rear faces of the latter lugs being cam or screw faces.

12. In an automatic fire arm the combination with a recoiling barrel and means for stopping and arresting it at a certain point of its travel, of a breech bolt, comprising a slider, capable of a rectilinear motion and a head capable only of a rotatory motion relatively to said slider and an automatic sear device, comprising a spring actuated sear pivotally mounted on the breech bolt, a notch on the sear and a nose on the cocking sleeve, capable of engaging said notch, thereby arresting the cocking sleeve in cocked position, said sear having an arm extending between the locking lugs of the barrel and having on the arm a lug, adapted to engage one of said lugs when the breech bolt is withdrawn from the barrel by hand.

13. In an automatic fire arm, the combination with the breech-bolt, an automatic sear device, comprising a spring actuated sear arm pivotally mounted on the breech bolt, a cocking piece, a firing pin connected therewith, a nose on the cocking piece capable of engaging a notch on the sear arm thereby arresting the cocking piece in cocked position, of a trigger, and a sear actuated by the latter engaging the cocking piece.

14. In an automatic firearm the combination with a recoiling barrel, a breech bolt capable of recoiling a longer distance than the barrel and a cartridge feeding mechanism, of a cartridge conveyer comprising a gripping device movably mounted on the breechbolt, means to move the same radially relatively to the bore of the barrel to fetch a cartridge, means to move the same in a direction parallel with the axis of the gun to draw the cartridge out of the cartridge feeder, means to move the cartridge parallel to its own axis to bring it in the line of the axis of the gun, means to drive the cartridge into the chamber and means to release it from the gripping device before the breech bolt locks the chamber.

15. In an automatic firearm a recoiling barrel, means to stop and arrest the barrel, a recoiling breech bolt, means to unlock the breech bolt from the barrel, so that the breech bolt continues to recoil after the barrel has come to a stop, a cartridge feeding mechanism on top of the barrel, an oblique guideway on the breech bolt facing the cartridge feeding mechanism, a slide on the guideway and a cartridge gripping device on the slide, said slide being capable of a movement up and down on said guideway, thereby bringing the said cartridge gripping device alternately in axial line with a cartridge in the feeding device and with the bore of the gun.

16. In an automatic firearm a cartridge feeding mechanism a cartridge conveyer comprising an oblique guideway on the breech bolt facing the cartridge feeding mechanism, a slide on the guideway, a cartridge gripping device on the slide, said slide being capable of a movement up and down on said guideway, thereby bringing the said cartridge gripping device alternately in axial line with a cartridge in the feeding mechanism and with the bore of the gun, means to arrest the slide, when it arrives at its uppermost position, means to release the slide during the recoil movement of the breech bolt and means to cause the slide to be lowered during said movement of the breech bolt.

17. In an automatic firearm the combination with the reciprocating breech bolt and a cartridge feeding device on top of the barrel, of a guideway on the breech bolt facing the cartridge feeding device, a slide capable of a vertical movement on said guideway and having two parallel vertical gripping ribs adapted to engage the cartridge end by a vertical movement, a spring actuated arresting hook for arresting the slide in its uppermost position, a spring actuated lever projecting from the rear between the said gripping ribs to press on the cartridge from behind, a lug on the breech casing for releasing the said hook during the backward travel of the breech bolt, means to move the slide upwardly before the breechbolt comes to rest in its forward movement so as to free the cartridge from the hold of the gripping device and means to guide the slide in its continued upward movement to direct the gripping ribs onto the end of the cartridge in the feeding device.

18. In an automatic fire-arm, the combination with a recoiling barrel and a cartridge feed-box secured to the breech casing, of a slide mounted in the box, a pusher mounted on the slide, a driving arm pivoted at one end in the feed box and having its free end engaging the slide, and a lug on the driving arm adapted to transmit the movement of the barrel to said arm.

19. In an automatic fire-arm, the combination with a recoiling barrel and a cartridge feed-box secured to the breech casing, of a slide mounted in the box, a pusher pivoted on the slide, a driving arm pivoted at one end in the feed box and having its free end engaging the slide, a lug on the driving arm connected with the barrel, and a spring controlled oscillatory support projecting into the feed-box.

20. In an automatic fire-arm, the combination with a recoiling barrel and a cartridge feed-box secured to the breech casing, of a slide mounted in the box and movable transversely of the gun barrel, an oscillatory spring pressed pusher mounted on the slide, a driving arm pivoted at one end in the box and having its free end engaging the slide, a guide-piece fixed on the gun barrel, a lug on the driving arm projecting into an oblique slot in the guide piece, and a spring-controlled oscillatory support projecting into the feed box.

21. In an automatic fire-arm, the combination with a recoiling barrel and a cartridge feed-box secured to the breech casing, of a slide mounted in the box and movable transversely of the gun barrel, a pusher pivoted on one side of the slide and having a curved arm adapted to rest on top of a cartridge in the box and a straight arm adapted to engage the side of said cartridge, a spring to yieldingly depress said arms, a driving arm pivoted at one end in the box and having its free end engaging the sides of a slot in the slide, a lug on the driving arm between its ends connected with the barrel, and a spring controlled oscillatory support projecting through the bottom of the box and adapted to contact with a cartridge engaged by the arms of the pusher.

22. In an automatic fire-arm, the combination with a recoiling barrel, of a cartridge feed-box mounted on top the fire-arm at the rear end of the barrel and provided with transverse guide ribs, a transversely movable slide within the box, gripping members on the slide, an oscillatory pusher pivoted on one side of the slide and having a curved arm adapted to rest on top of a cartridge in the box and a straight arm adapted to engage the side of the cartridge, a spring to yieldingly depress said arms, a driving arm pivoted at the front end of the box and having its free rear end engaging the sides of a slot in the slide, a guide-piece fixed on the gun barrel, a lug on the driving arm projecting into an oblique slot in the guide-piece, and a spring controlled oscillatory support projecting through the bottom of the box and adapted to contact with a cartridge engaged by the arms of the pusher.

23. In an automatic firearm a combined axially and vertically movable cartridge conveyer, a cartridge feeding belt transversely movable in front of the said conveyer above the rear end of the barrel, a transversely movable slide in operative engagement with a lever fulcrum on a stationary part of the arm and having a lug entering a slot in a member fitted on top of the barrel and having locking lugs preventing it from axial and transverse movement, said slot having a straight, longitudinal portion at both ends and an oblique portion at the middle.

24. In an automatic firearm the combination with a recoiling barrel and means for arresting it at a certain point of its travel, of a breech bolt comprising a slider capable of a rectilinear motion and a head capable only of a rotatory motion relatively to said slider, means for interlocking the breech bolt head with the barrel and means for imparting rotary motion to the head during the period of its travel coincident with the travel of the barrel, an ejector comprising a slidable rod resting in an oblique groove in the slider and a lug entering a groove in the breech casing, said groove running parallel with the axis of the barrel and having an oblique offset, acting to throw the ejector rod forward.

In testimony that I claim the foregoing as my invention, I have signed my name in presence of two subscribing witnesses.

NILS BJÖRGUM.

Witnesses:
HENRY BORDEWICH.
AUG. OLSEN.